Patented Mar. 19, 1929.

UNITED STATES PATENT OFFICE.

STANLEY A. SANFORD, OF SHAKER HEIGHTS, OHIO.

PROCESS OF SOFTENING WATER.

No Drawing.    Application filed November 30, 1926.   Serial No. 151,829.

This invention relates to a process of treating water for the purpose of obtaining water of zero hardness, the main object of which is to provide a process of treating raw water in such a manner as to soften the same by removing the bases which cause temporary and permanent hardness and also in the same operation removing all iron, silica and alumina together with the carbonates, sulphates and phosphates and in the same operation completely saponifying any free oil which may be present.

Another object of the invention is to provide a process of softening and clarifying the most turbid water without the addition of any of the so-called coagulating chemicals such as ferrous sulphate or aluminum sulphate.

Another object of the invention is to provide a water softening process which is well adapted for either domestic or industrial purposes in any quantity whatsoever. Large or small volumes may be treated in any and all types of tanks, flumes, troughs, pipes or tunnels and in fact any sort or kind of apparatus, appliance or appurtenance.

Generally speaking the process consists in isolating any desired amount of raw water and in mixing with the raw water a predetermined amount of my special chemical mixture, agitating the mixture by manual or mechanical means to insure an intimate commingling of the chemical with all parts of the water, ceasing the agitation and allowing the entire volume of the liquid to stand quiescent to secure precipitation of all suspended matter from the entire volume of liquid. This separation of suspended matter is accomplished without the requirement of any additional or special coagulating chemicals. After the necessary time for sedimentation has elapsed the supernatant liquid is drawn off or conveyed either to mechanical or sand filters or to the clear soft water reservoir, whichever course is desirable. The raw water treated in this manner with my special chemical will be free from all suspended matter and from oil and organic matter which may have been floating on the raw water.

More specifically my process consists in mixing with the raw water, in a manner hereinbefore described, a predetermined amount of fluoride either in the solid or liquid state or in combination or mixture with any metal or in combination or mixture with any salt of any metal or in combination or mixture with any metal and any salt of any metal. The amount of fluoride added and the metal or metallic salt with which it is combined depends upon the character of the mineral content of the water being treated. According to the preferred embodiment of my invention I employ a chemical combination, the active ingredients of which are fluorine, barium and aluminum and this combination is known as

*Barium-fluoro-aluminate.*

I produce barium-fluoro-aluminate by mixing and heating together one part of barytes ($BaSO_4$), one part of bauxite ($Al_2O_3$) and two parts of fluorspar ($CaF_2$) and treating the mixture with four parts of live steam. The steam liquefies the mixture and forms calcium sulphate ($CaSO_4$) and a concentrate solution of barium-fluoro-aluminate; and a concentrate solution of $BaF-Al_2O_3$ precipitates $BaF\ Al_2O_3$ by crystallization. The product obtained is a white powder which is soluble in water and is used in my water softening process either in a powder form or in solution.

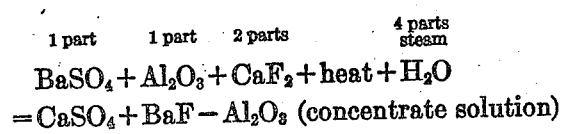

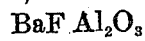

$$BaSO_4 + Al_2O_3 + CaF_2 + heat + H_2O$$
$$= CaSO_4 + BaF - Al_2O_3 \text{ (concentrate solution)}$$

which by crystallization forms

*Barium-fluoro-aluminate.*

$BaF\ Al_2O_3$

The reactions which take place upon adding this chemical combination to raw water are as follows: The fluorine quickly combines with the calcium (Ca), magnesium (Mg), iron (Fe) and silica (Si) present forming insoluble Ca, Mg, Fe and Si fluorides which are readily thrown out of solution. The barium present combines with the carbonates and sulphates and phosphates forming insoluble barium salts which are readily thrown out of solution. The aluminate creates the floc which enmeshes all suspended matter forming coagulation and consequent settling. The aluminate also saponifies all free oil and oily organic matter by reason of the hydroxide normally present.

Assuming that the water to be treated contains calcium, iron, magnesium, silica, carbonates, sulphates and phosphates, the following chemical action takes places:

|  |  |  | Insoluble | Insoluble |
|---|---|---|---|---|
| Calcium carbonate | $CaCO_3$ | $+ BaF_2Al_3O_4 =$ | $CaF_2Al_3O_4$ | $+ BaCO_3$ |
| Calcium sulphate | $CaSO_4$ | $+ BaF_2Al_3O_4 =$ | $CaF_2Al_3O_4$ | $+ BaSO_4$ |
| Iron sulphate | $Fe_2SO_4$ | $+ BaF_2Al_3O_4 =$ | $Fe_2F_2Al_3O_4$ | $+ BaSO_4$ |
| Mg. carbonate | $MgCO_3$ | $+ BaF_2Al_3O_4 =$ | $MgF_2Al_3O_4$ | $+ BaCO_3$ |
| Mg. sulphate | $MgSO_4$ | $+ BaF_2Al_3O_4 =$ | $MgF_2Al_3O_4$ | $+ BaSO_4$ |
|  |  |  |  | Soluble |
| Sodium silicate | $Na_2SiO_4$ | $+ BaF_2Al_3O_4 =$ | $BaF\ SiF$ | $+ Na_2Al_3O_4$ |
| Sodium triphosphate | $Na_3PO_4$ | $+ BaF_2Al_3O_4 =$ | $BaP_2O_5$ | $+ NaF\ Al_3O_4$ |

It will therefore be clear that the raw water after treatment will be of zero hardness and that the bases which cause both the temporary and permanent hardness are simultaneously precipitated and that in the same operation all free and oily organic matter will be saponified by reason of the hydroxide normally present. Water treated according to my process requires 1–5 drops of standard soap solution per 50 cubic centimeters of water to produce permanent soap.

My process may also be carried out by feeding the barium-fluoro-aluminate at predetermined rate into a pipe line, conduit or flume in which the raw water is flowing. In this application of my process I feed the barium-fluoro-aluminate into the pipe line, either in a powder or liquid form, at a predetermined rate, and within the pipe line I provide some suitable means for thoroughly agitating and commingling the chemical and water. The mixture is then fed into a centrifugal separator by means of which the precipitate is separated from the solution and the clear soft water is drawn off. This application of my process requires no settling tank or reservoir and is well adapted to domestic use and for softening water for use in boilers in industrial plants.

It will now be clear that I have provided a water softening process which will accomplish the objects of the invention as hereinbefore stated and I wish my invention to be limited only in accordance with the scope of the appended claims.

Having thus described my invention, what I claim is:—

1. The steps in the process of softening water which consists in mixing with raw water a chemical mixture containing barium-fluoride to precipitate the bases which cause temporary and permanent hardness without the use of any additional coagulating chemical.

2. The steps in the process of softening water which consists in mixing with raw water a chemical mixture containing barium-fluoride which simultaneously removes from the solution the bases causing temporary and permanent hardness without the use of any additional coagulating or saponifying chemical and which also in the same operation completely saponifies any free oil present.

3. The process of softening water which consists in mixing with raw water a predetermined amount of barium-fluoride-aluminate in such a manner as to simultaneously remove from solution the bases causing temporary and permanent hardness and which also in the same operation saponifies any free oil present without the use of any additional coagulating chemical, and withdrawing the remaining mixture.

In testimony whereof, I hereunto affix my signature.

STANLEY A. SANFORD.